UNITED STATES PATENT OFFICE.

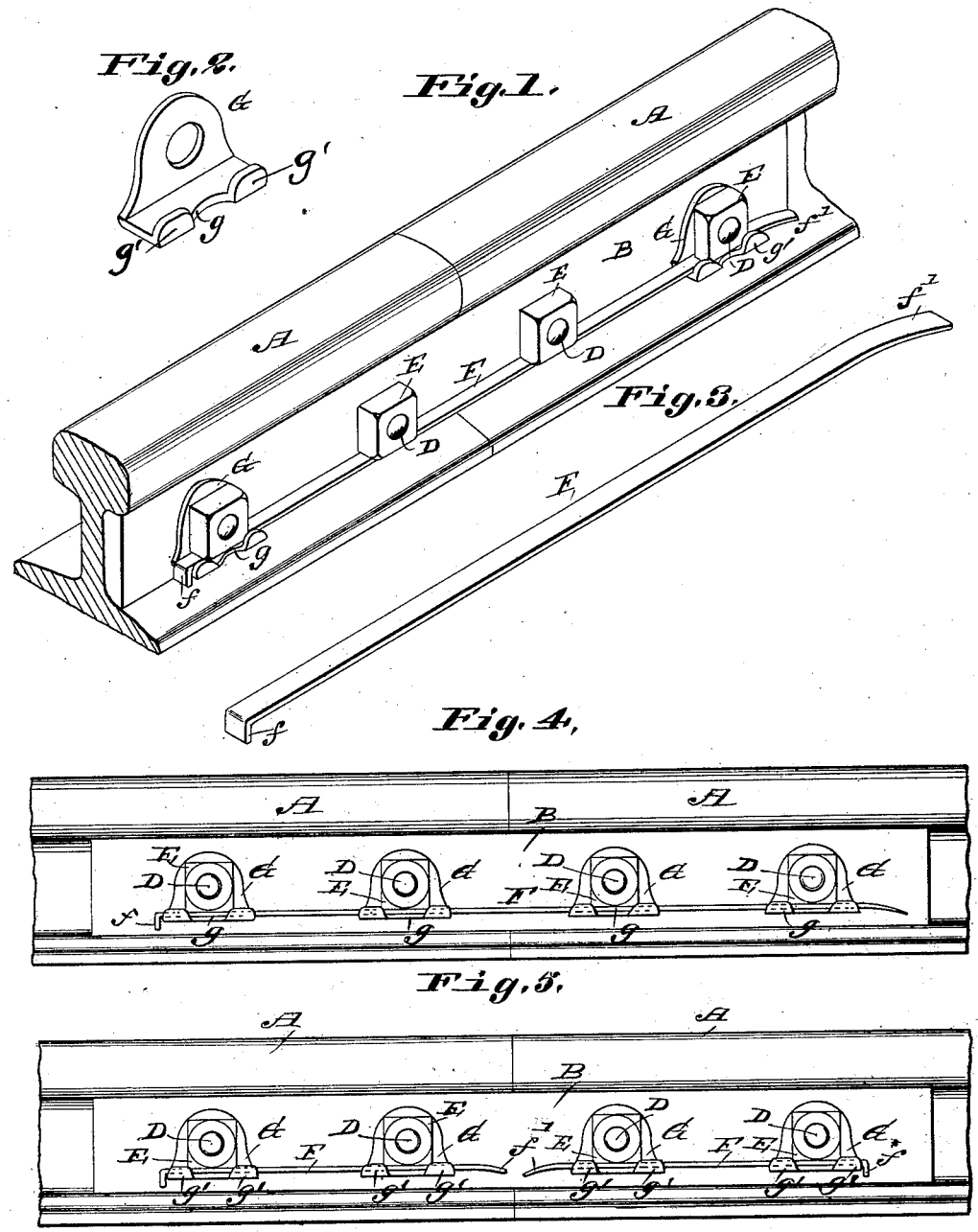

ROY DODSON, OF CENTRAL, ST. LOUIS COUNTY, MISSOURI.

NUT-LOCK.

SPECIFICATION forming part of Letters Patent No. 333,839, dated January 5, 1886.

Application filed June 5, 1884. Serial No. 133,934. (No model.)

*To all whom it may concern:*

Be it known that I, ROY DODSON, of Central township, St. Louis county, Missouri, have made a new and useful Improvement in Nut-Locks, of which the following is a full, clear, and exact description, reference being had to the annexed drawings, making part of this specification, in which—

Figure 1 is a view in perspective of a railway-joint having the improvement; Fig. 2, a view in perspective of one of the washers; Fig. 3, a view in perspective of the locking-rod; Fig. 4, a side elevation of the joint; and Fig. 5, a side elevation of the joint showing a modification of the locking-rod.

The same letters of reference denote the same parts.

The present construction is a modification of a nut-lock described in a pending application.

A A represent the opposing rail ends of the joint.

B represents the fish-bar upon that side of the rails to which the washers and nuts are applied. D D represent the bolts, and E E represent the nuts, all as in the ordinary form and also as in the construction above referred to, saving that the fish-bar is made without the lip there shown, for, in place of providing the fish-bar B with a lip and inserting the locking-rod F between the lip and the nuts, the fish-bar has no lip and the locking-rod is inserted between the nuts and the lip or lips $g\ g$ of the washers G G, substantially as shown in Figs. 1, 4—that is to say, the washers G G, which otherwise are of the usual form and used in the usual way, are supplied with one or more lips $g\ g$, substantially as shown, and the nuts are kept from turning by means of the locking-rod F, which should be long enough to extend past at least two of the nuts, as in Fig. 5, and, if desired, long enough to extend past all of the nuts, as in Fig. 4. The locking-rod is constructed, as before, of springy material, is provided with a head or projection, $f'$, and its end $f'$ is crooked to hold the rod in place.

I am aware that nut-locks have been constructed which locked some of the nuts with a bar similar to mine and supported in much the same manner. I am not aware, however, that my peculiar construction of rod and stirrup has been used in this connection; and What I therefore desire to secure by Letters Patent is—

In a nut-lock, the perforated stirrup-shaped washers G G, having the lips $g'\ g'$, in combination with the perforated rails A A, bolts D D, nuts E E, spring locking-rod F, having the head $f$ at one end and the curved elastic portion $f'$ at the opposite end, substantially as set forth.

ROY DODSON.

Witnesses:
C. D. MOODY,
CORA E. HUNT.